May 9, 1950 M. U. ROSENDAHL 2,507,272
TRACTOR OPERATED WIRE WINDING AND UNWINDING REEL
Filed Oct. 27, 1947 2 Sheets-Sheet 2
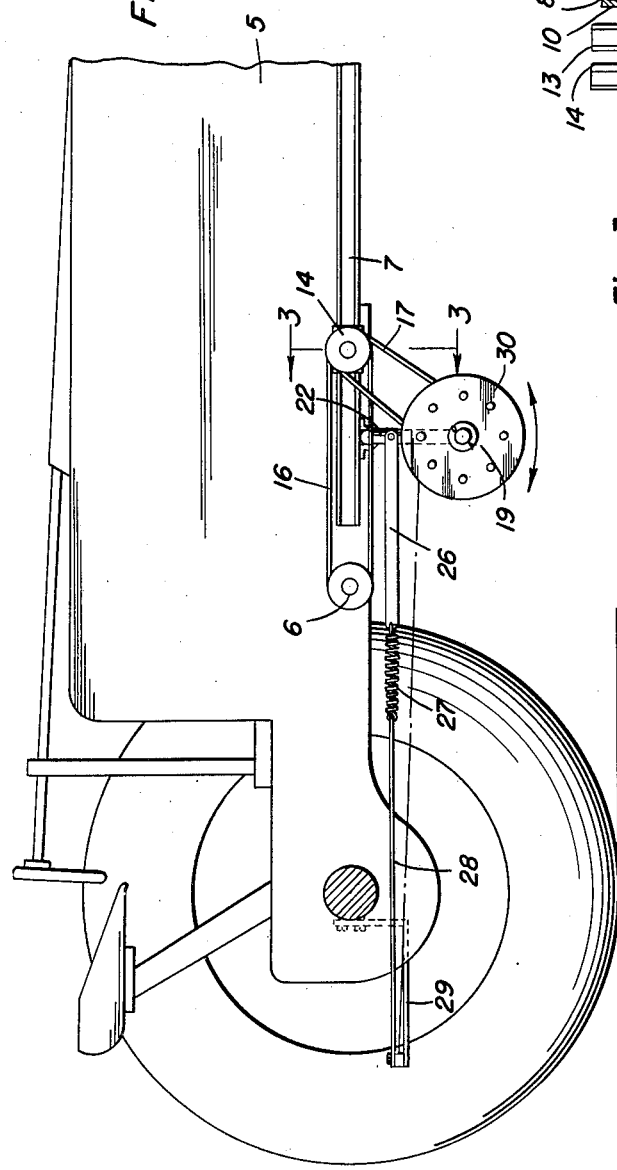
Inventor
Martin U. Rosendahl Patented May 9, 1950

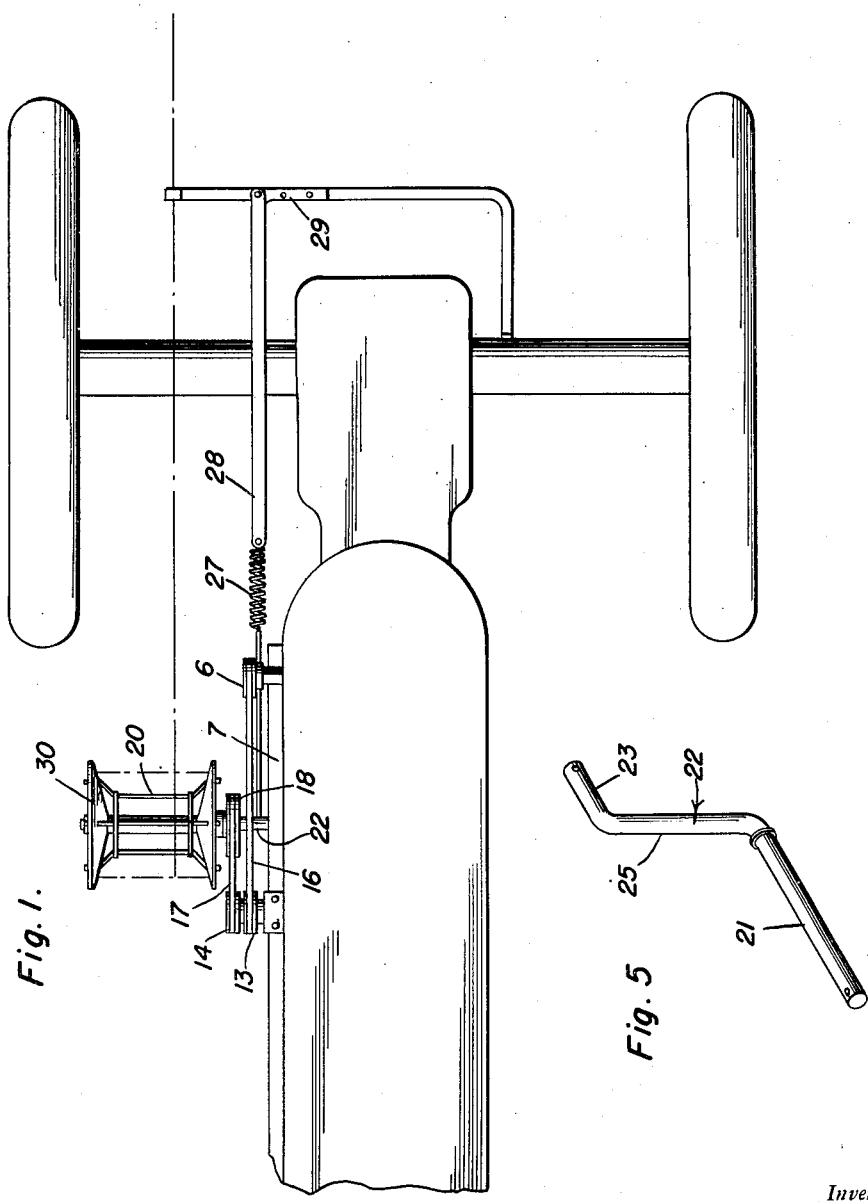

2,507,272

UNITED STATES PATENT OFFICE 2,507,272

TRACTOR OPERATED WIRE WINDING AND UNWINDING REEL

Martin U. Rosendahl, Knierim, Iowa

Application October 27, 1947, Serial No. 782,253

4 Claims. (Cl. 242—90)

The present invention relates to new and useful improvements in wire winding and unwinding reels and more particularly to a tractor operated wire reel.

An important object of the present invention is to provide a novel power operated reel structure designed for mounting upon a tractor frame to be operated by the belt pulley of the tractor whereby wire may be conveniently and uniformly wound upon a reel, or unwound or paid out therefrom, as desired.

A further object of the invention is to provide automatic tension compensating means for the reel to uniformly wind wire thereon.

A still further object is to provide a reel structure on which a roll of wire wound on the reel may be easily removed therefrom bodily or a previously wound roll of wire mounted on the reel for unwinding therefrom.

A still further object is to provide a device of this character of simple and practical construction, which is efficient and reliable in operation, which may be easily and quickly mounted in position on a conventional tractor without necessitating any material changes or alterations in the construction thereof and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a side elevational view with parts broken away and shown in section;

Figure 3 is an enlarged fragmentary sectional view taken on the line 3—3 of Figure 2;

Figure 4 is a transverse sectional view of the reel taken on the line 4—4 of Figure 3; and, Figure 5 is a perspective view of the crank shaped supporting arm of the reel.

Referring now to the drawings in detail wherein for the purpose of illustration I have disclosed a preferred embodiment of the invention the numeral 5 designates a conventional tractor including a power take-off belt driving pulley 6 at one side thereof.

A channel member 7 is shown in a longitudinal position at one side of the tractor with the upper and lower flanges 8 and 9 of the channel projecting outwardly from the tractor.

A U-shaped bracket 10 is positioned horizontally on the channel member with its upper end positioned on top of the upper flange 8 and its lower end positioned under the lower flange 9 and secured in slidably adjusted position to the channel member by bolts and nuts or other suitable fastening devices 11.

A pulley shaft 12 has one end journaled in the bracket 10 and projects horizontally outwardly therefrom and on which idler pulleys 13 and 14 are journaled, the pulleys being integrally or otherwise connected to each other for uniform rotation by a hub 15.

The pulley 13 is driven by a belt 16 from the power take-off pulley 6 and the pulley 14 drives a belt 17 which is trained over a pulley 18 secured to the inner hub portion 19 of a wire reel 20.

The hub 19 of the reel is journaled on the lower outwardly extending end 21 of a crank arm 22 which includes an upper inwardly extending end 23 pivoted in a bearing 24 suitably secured to the underside of the channel member 7 adjacent its rear ends and rearwardly of the bracket 10.

The crank arm 22 also includes a vertical intermediate portion 25 to which one end of a bar 26 is pivotally attached and extending rearwardly therefrom and to the rear end of which is attached a coil spring 27 which has its rear end attached to the rear portion of the tractor by means of a wire rod 28 and bracket 29 of a check row planter.

The reel 20 includes an outer flange 30 detachable from the reel to permit a roll of wire to be mounted on the reel or removed therefrom.

In the operation of the device, the reel 20 is driven by the belts 16 and 17 from the power take-off pulley 6 of the tractor to wind or unwind wire thereon, the reel being held in a rearwardly swinging position on arm 22 by spring 27 to keep the belt 17 tight and prevent the reel from rotating too rapidly during the unreeling action, when paying out the wire rearwardly of the tractor.

Wire is wound on the reel from a forward direction and should the wire tend to tighten when winding, the reel will swing forwardly against tension of spring 27 and permit slipping of belt 17 to thus maintain uniform winding of the wire.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a tractor having a power take-off pulley, of a wire reel including a crank arm pivoted to the tractor for forward and rearward swinging movement and on which a reel is journaled, belt drive means between the power tak-off pulley and the reel, and spring means connected to the arm and holding the reel in a belt tightening position.

2. In combination, a tractor having a power take-off pulley, an arm having parallel angular end portions with a reel journaled on one end, means pivotally suspending the arm at its other end to the tractor for forward and rearward swinging movement of the reel, belt drive means between the pulley and the reel and extending from the reel in a forward direction, and automatic belt tightening means for said belt drive means.

3. In combination, a tractor having a power take-off pulley, an arm having parallel angular end portions with a reel journaled on one end, means pivotally suspending the arm at its other end to the tractor for forward and rearward swinging movement of the reel, belt drive means between the pulley and the reel and extending from the reel in a forward direction, and spring means extending from the arm in a rearward direction to hold the belt drive means tightened.

4. In combination, a tractor having a channel frame and a power take-off pulley, a shaft having a double pulley journaled thereon, a bracket secured in longitudinally adjusted position to the channel frame, a bearing carried by the bracket for said shaft, a drive belt connecting the power take-off pulley to one of said double pulleys, a crank arm pivoted at one end to the frame for forward and rearward swinging movement, a reel journaled on the other end of the arm, a belt driving the reel from the other of said double pulleys, said reel being positioned rearwardly of said double pulleys, and spring actuated belt tightening means connected to the crank arm for pulling the arm in a direction for tightening said last-named belt.

MARTIN U. ROSENDAHL.

REFERENCES CITED

The following references are of record in the file of this patent:

UNITED STATES PATENTS

| Number | Name | Date |
|---|---|---|
| 794,008 | Hadland | July 4, 1905 |
| 1,277,559 | Emory | Sept. 3, 1918 |
| 1,299,566 | Emory | Apr. 8, 1919 |
| 1,976,314 | White | Oct. 9, 1934 |
| 2,018,852 | Hart | Oct. 29, 1935 |
| 2,171,034 | Kriegbaum et al. | Aug. 29, 1939 |